UNITED STATES PATENT OFFICE 2,178,382

CARBON BLACK

William B. Wiegand, Old Greenwich, Conn., assignor to Columbian Carbon Company, New York, N. Y., a corporation of Delaware No Drawing. Application June 17, 1937,
Serial No. 148,665

21 Claims. (Cl. 134—58)

This invention relates to improvements in commercial carbon blacks and lamp blacks; and more particularly to improvements in the production of such blacks in pellet or granular form. It includes not only processes for the production of blacks in such forms, but also the improved pellet or granular commercial carbon blacks and lamp blacks.

When commercial carbon blacks or lamp blacks are produced in any of the various granular forms, they do not retain all of the desirable properties of the original products unimpaired, as the processes of granulation or pelleting, which are well known and widely used, result in a product which is not fully equivalent to the original product. The primary effect of these processes, insofar as they deleteriously effect the carbon black or lamp black, is to impair the dispersing and reinforcing properties of the blacks, so that a commercial carbon black or lamp black which has been converted to a granular or pellet form does not disperse as readily as the original black from which it was produced, or reinforce as well. This reduction in the dispersing properties of the blacks is noticeable in various products in which the blacks may be used. For example, when the granular blacks are used as pigments for paints or lacquers or the like, there is a noticeable loss in the jetness, gloss, and stability of the paint or lacquer, attributable to the decreased dispersion of the black. The terms "disperse" and "dispersion", as used herein, refer to the ultimate state of distribution of the particles, as distinguished from simple incorporation. The degree of dispersion of a black, when used in a paint or lacquer, is measured by jetness, gloss, stability with respect to settling, durability of films obtained, etc. In rubber, the degree of dispersion is measured by electrical resistivity, tear resistance, flex resistance, etc.

Nevertheless, because of the convenience in handling the blacks in pellet or granular form, their use is rapidly increasing, despite the fact that such blacks have lost some of the advantageous properties of the original, fluffy blacks.

By the present invention, carbon blacks and lamp blacks are provided in pellet or granular form which are substantially equivalent, in dispersing properties and other properties, to the original blacks from which they are produced, or are even superior in these respects to the original blacks. These improved blacks in pellet or granular form disperse more readily and completely than previously known blacks in such form, and when used in paints or lacquers or the like, give improved color and gloss, improve the stability of the paint or lacquer by reducing the tendency to settle, and reduce the effect of ultra-violet light and ozone on the films produced from such paints or lacquers. When used in rubber, the new pelleted or granular blacks impart greatly improved insulating properties, rubber produced with such blacks having electrical resistivity values as much as 2 to 4 times as great as comparable rubber products produced from previously known pelleted or granular blacks.

Commercial carbon blacks and lamp blacks, when wetted with water, attract OH ions and repel H ions, with the result that aqueous suspensions and sludges of these materials have definitely acid pH values. If from 3 to 10 parts of distilled water are added to one of these blacks and the mixture be boiled for about 15 minutes, cooled, and the supernatant liquid decanted, a sludge is obtained which in contact with the glass electrode of a pH electrometer gives a pH reading characteristic of the material. In this specification and the appended claims, where reference is made to the "aqueous sludge pH" of a black, it is to the pH determined in this manner. The supernatant liquid obtained in this test also is definitely acid, but measurements made on the supernatant liquid are not as characteristic or sharply demarcated as those obtained from the sludges, although generally parallel thereto. Further, simple suspensions or slurries of such blacks in cold water are definitely acid, but again the measurements made are not as characteristic or reproducible as those obtained by the technique described above.

Sludges obtained as described from commercial carbon blacks and lamp blacks vary quite widely in pH values, high color blacks giving sludges with pH's as low as about 2.5 and rubber carbon blacks and lamp blacks giving sludges with pH's ranging up to about 5.

These acid properties of such blacks are not due to mineral or other extractable acid, as the amount of acid which can be extracted by repeated extractions with either hot or cold water is much less than would account for the degree of acidity of the sludges.

Carbon blacks which have been subjected to a deactivating heat treatment in a non-oxidizing atmosphere do not form acid sludges, but instead produce sludges having an alkaline reaction, with pH's ranging, for example, from 8 to above 10. These latter types of blacks do not disperse readily when used, and lack many of the advantages of the commercial carbon blacks and lamp blacks.

If, in place of distilled water, a commercial carbon black or lamp black be wetted with an aqueous solution of an alkali or salt, advantageously a hot solution, the black adsorbs the free hydroxide, present as such or formed by hydrolysis; and if a black so treated be separated from the water, it retains the hydroxide, and when subsequently again converted into a sludge, as with distilled water, no longer forms an acid sludge, but forms a sludge having a higher pH, the exact value of which, of course, depends upon the amount of alkali adsorbed and the character of the black. The blacks so treated, carrying an adsorbed neutralizing agent, when converted into a pellet or granular form, have dispersing properties greatly superior to those of similar blacks which have not been subjected to a neutralizing treatment when converted into the pellet or granular form.

The amount of alkali, alkaline salt or neutral salt which is required to effect the marked improvement in the blacks which ordinarily form acid sludges may be varied within relatively wide limits, but the treatment should be such that the black produced has an aqueous sludge pH between about 6.0 and about 9.0, as compared with the pH value of sludges from the original blacks, which may range from about 2 to about 5. The amount of alkali or salt which will be required to effect this increase in the pH value will of course depend upon the character of the blacks treated, those blacks which form the most acid sludges requiring the largest amount of alkali or salt, and those blacks which form sludges having pH's ranging between 4 and 5 requiring much less alkali or salt, and upon the aqueous sludge pH desired for the final product, more alkali being required to raise the aqueous sludge pH to values approaching 9 than is required to raise it a little above 6. In general, the amount of alkali, alkaline salt or neutral salt which will be required will be an amount corresponding to from about 0.2 to 2.0% of caustic soda based on the black. The adsorbed alkali is strongly held by the black, usually only a minor proportion being extractable by repeated washing with hot water. For example, a high color black, having about 0.5% of adsorbed caustic soda and a pH above 7.0, will contain less than 0.2% of extractable alkali, calculated as caustic soda. An important characteristic of the new blacks is that repeated washing with hot or cold water does not extract sufficient alkali to reduce the aqueous sludge pH of the products below about 6.0, showing that there is a substantial amount of adsorbed alkali which is not extractable with water. Where reference is made herein to extraction of treated black with water, it is to extraction with pure (pH 7.0) water.

A wide range of alkalies, alkaline salts and neutral salts may be used in practicing the invention, including alkali metal and alkaline earth metal hydroxides, such as caustic soda, caustic potash and lime, the alkali metal and alkaline earth metal salts, such as alkali metal and alkaline earth metal carbonates, particularly those which are water soluble, such as sodium carbonate and calcium bicarbonate, the alkali metal and alkaline earth metal phosphates, silicates, borates, etc., as well as such neutral salts as sodium chloride, potassium chloride, etc. When a free base such as caustic soda or lime is used in proper amount, it is not necessary to treat the black after it has been wet with an aqueous solution thereof except for such treatment as is required to convert it into the pellet or granular form; whereas when a neutral salt, such as sodium chloride, is used, it is important to wash the black after treatment to remove any of the acid, set free when the hydroxide formed by hydrolysis is adsorbed by the carbon black, which may adhere to the black. When alkaline salts, such as a carbonate, silicate or borate is used, it may be desirable to wash the product to remove free acid, although the desired neutralization is effected without such washing.

The invention will be further illustrated by the following examples, although it is to be understood that it is not limited thereto.

*Example 1.*—A rubber grade of commercial carbon black is heated with about 7 times its weight of water containing 0.25% of caustic soda based upon the carbon black, care being taken that the carbon black is thoroughly wet with the solution so that the caustic soda is uniformly adsorbed by the black. The resulting slurry is then shaken or agitated for about 5 minutes with gasoline or the like, as described in the Wiegand and Venuto Patent No. 1,889,429, with the production of the carbon black in the form of small, spheroidal pellets which are porous and friable. The resulting dustless, pelleted carbon black has dispersing properties similar to those of the original untreated carbon black, and decidedly superior to the dispersing properties of pelleted blacks produced from the same black without neutralization. The product so produced has an aqueous sludge pH somewhat above 7, whereas the original carbon black has an aqueous sludge pH of about 4. The caustic soda is strongly adsorbed by the black and forms a more or less permanent combination with the carbon particles, as is shown by the fact that only about ⅛ of it can be removed by repeated extractions with hot distilled water. The alkali is not present in a free state, and does not produce any deleterious effects when the carbon black is used, for example, in rubber, such as would be caused by free caustic soda.

*Example 2.*—20 parts of a commercial carbon black of rubber grade, having an aqueous sludge pH of about 4.0, are agitated with 250 parts of a hot, saturated aqueous solution of sodium chloride. The black is then washed repeatedly with water to remove the free acid formed by the adsorption of sodium hydroxide, after which it is converted into a granular form. The resulting product has an aqueous sludge pH of about 6.3, and shows greatly improved dispersing properties.

*Example 3.*—A high color carbon black having an aqueous sludge pH of about 3.0 is admixed with about 3.00 to 4.00% of calcium hydroxide, after which the mixture is formed into a slurry with water and heated for about one hour or more. The carbon black adsorbs the calcium hydroxide and is neutralized by it, and is then converted into a pellet or granular form having excellent dispersing properties. The product has an aqueous sludge pH of about 8.0 to 9.0.

The granular or pellet blacks to which this invention relates are well known. They may be produced in the form of uniform spheres, irregular masses, flakes, etc., by known processes; but in general are soft, porous, friable masses of the black, free from binders, and readily pulverized by slight pressure, as distinguished from the aggregates or hard cakes obtained by simple drying of a suspension of the black in a liquid, such as water. A particularly important application of the invention is in the production of the blacks in the form of dustless, spheroidal pellets.

To effect the marked improvement in the pelleted or granular commercial carbon blacks and lamp blacks of the present invention, it is important that the amount of alkali adsorbed by the carbon black be such as to yield a product having an aqueous sludge pH ranging from about 6.0 to about 9.0, advantageously between 6.0 and 8.0. The blacks so produced are quite dissimilar from other blacks, such as thermal blacks and deactive heat treated blacks which form sludges having similar pH values, but which do not have the oxygen content of the new black, which is substantially the same as the oxygen content of the commercial carbon blacks or lamp blacks from which they are produced, and which do not have the adsorbed alkali. The dispersing and reinforcing properties of the new blacks are superior to those of the thermal blacks or deactive heat treated blacks, or of commercial carbon blacks or lamp blacks which have been converted to a granular form without prior neutralization, and may even be superior to those of commercial carbon blacks and lamp blacks in their original form. The new and improved product of the present invention thus has the advantages of ease of handling of previously known granular carbon blacks and lamp blacks without having undergone any loss in their dispersing or reinforcing properties because of the treatment to which they have been subjected, and, in fact, in these respects, are superior to the original fluffy materials.

The term "non-deactive heat treated carbon blacks and lamp blacks" as used herein designates materials which have not been subjected to a deactive heat treatment.

I claim:

1. The process of producing a substance of the class consisting of non-deactive heat treated carbon blacks and lamp blacks in granular form which comprises causing the black to adsorb sufficient fixed alkali so that it has an "aqueous sludge pH" of from about 6.0 to about 9.0, and converting the black so treated to a granular form.

2. The process of producing a substance of the class consisting of non-deactive heat treated carbon blacks and lamp blacks in granular form which comprises treating the black, in the presence of water, with a fixed alkaline material in sufficient quantity to raise the "aqueous sludge pH" of the black to a value between about 6.0 and about 9.0 and converting the black so treated to a granular form.

3. The process of producing a substance of the class consisting of non-deactive heat treated carbon blacks and lamp blacks in granular form which comprises treating the black with an aqueous solution of a fixed alkali in sufficient quantity to raise the "aqueous sludge pH" of the black to a value between about 6.0 and about 9.0 and converting the black so treated to a granular form.

4. The process of producing a substance of the class consisting of non-deactive heat treated carbon blacks and lamp blacks in granular form which comprises causing the black to adsorb a fixed alkali in amount equivalent to from 0.2 to 2.0% of caustic soda, based on the black, so that it has an "aqueous sludge pH" of from about 6.0 to about 9.0, and converting the black so treated to a granular form.

5. In the production of a substance of the class consisting of non-deactive heat treated carbon blacks and lamp blacks in granular form, the step of treating the black before granulation with a material of the class consisting of alkali metal hydroxides, alkaline earth metal hydroxides and salts thereof in the presence of water.

6. A substance of the class consisting of non-deactive heat treated carbon blacks and lamp blacks in granular form carrying an adsorbed fixed alkaline material and having an "aqueous sludge pH" ranging from about 6.0 to about 9.0.

7. A substance of the class consisting of non-deactive heat treated carbon blacks and lamp blacks in dustless, spheroidal pellet form carrying an adsorbed fixed alkaline material and having "an aqueous sludge pH" ranging from about 6.0 to about 9.0.

8. A substance of the class consisting of non-deactive heat treated carbon blacks and lamp blacks in granular form carrying an adsorbed fixed material of the class consisting of alkali metal and alkaline earth metal hydroxides, only a minor proportion of which is extractable by water.

9. A substance of the class consisting of non-deactive heat treated carbon blacks and lamp blacks in granular form carrying an adsorbed fixed alkali in amount corresponding to from 0.2 to 0.5% of caustic soda based on the black and having an "aqueous sludge pH" of from about 6.0 to about 9.0, only a minor proportion of said alkali being extractable by repeated washing with hot distilled water.

10. A substance of the class consisting of carbon blacks and lamp blacks in granular form having a normal oxygen content and carrying an adsorbed fixed alkaline material and having an "aqueous sludge pH" ranging from about 6.0 to about 9.0.

11. A substance of the class consisting of non-deactive heat treated carbon blacks and lamp blacks in granular form carrying an adsorbed fixed alkaline material and having an "aqueous sludge pH" ranging from about 6.0 to about 9.0, the alkaline material being so adsorbed by the black that repeated washing with water does not reduce the "aqueous sludge pH" of the black below about 6.0.

12. A substance of the class consisting of non-deactive heat treated carbon blacks and lamp blacks in granular form carrying an adsorbed fixed alkali and having an "aqueous sludge pH" ranging from about 6.0 to about 9.0, the alkali being so adsorbed by the black that repeated washing with water does not reduce the "aqueous sludge pH" of the black below about 6.0.

13. The process as in claim 5, in which the material used for the treatment of the black is a salt, and in which the black is washed to remove the acid formed or released before being converted into a granular form.

14. In the production of a substance of the class consisting of non-deactive heat treated carbon blacks and lamp blacks in granular form, the step of treating the black before granulation with a material of the class consisting of alkali metal hydroxides, alkaline earth metal hydroxides and salts thereof in amount sufficient to raise the "aqueous sludge pH" of the blacks to a value between about 6.0 and about 9.0, said treatment being carried out in the presence of water.

15. A substance of the class consisting of non-deactive heat treated carbon blacks and lamp blacks in granular form carrying an adsorbed material of the class consisting of alkali metal and alkaline earth metal hydroxides in amount sufficient to raise the "aqueous sludge pH" of the black to a value ranging from about 6.0 to about 9.0, only a minor proportion of the adsorbed material being extractable by water.

16. A substance of the class consisting of neutralized non-deactive heat treated carbon blacks and lamp blacks in granular form carrying an adsorbed fixed alkaline material and having an "aqueous sludge pH" ranging from about 6.0 to about 9.0.

17. A substance of the class consisting of neutralized non-deactive heat treated carbon blacks and lamp blacks in the form of dustless, spheroidal pellets, said blacks carrying an adsorbed fixed alkaline material and having an "aqueous sludge pH" ranging from about 6.0 to about 9.0.

18. A substance of the class consisting of non-deactive heat treated carbon blacks and lamp blacks neutralized with an adsorbed fixed alkaline material in granular form.

19. A substance of the class consisting of non-deactive heat treated carbon blacks and lamp blacks neutralized with an adsorbed fixed alkaline material in the form of dustless spheroidal pellets.

20. A substance of the class consisting of non-deactive heat treated carbon blacks and lamp blacks neutralized with an adsorbed fixed alkaline material in granular form, only a minor proportion of the adsorbed alkaline material being extractible by repeated washing with water.

21. A substance of the class consisting of non-deactive heat treated carbon blacks and lamp blacks neutralized with an adsorbed fixed alkaline material in the form of dustless spheroidal pellets, only a minor proportion of the adsorbed alkaline material being extractible by repeated washing with water.

WILLIAM B. WIEGAND.

CERTIFICATE OF CORRECTION.

Patent No. 2,178,382.     October 31, 1939.

WILLIAM B. WIEGAND.

It is hereby certified that error appears in the printed specification of the above numbered patent requiring correction as follows: Page 3, second column, line 18, claim 8, strike out the word "fixed"; and that the said Letters Patent should be read with this correction therein that the same may conform to the record of the case in the Patent Office.

Signed and sealed this 19th day of December, A. D. 1939.

(Seal)

Henry Van Arsdale,
Acting Commissioner of Patents.